United States Patent
Lingle et al.

(10) Patent No.: US 6,782,718 B2
(45) Date of Patent: Aug. 31, 2004

(54) METHOD OF MAKING MATCHABLE LOW-E I.G UNITS AND LAMINATES

(75) Inventors: Philip J. Lingle, Temperance, MI (US); Grzegorz Stachowiak, Ann Arbor, MI (US); Steven L. Larson, Elk Grove, CA (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/246,617

(22) Filed: Sep. 19, 2002

(65) Prior Publication Data

US 2003/0101749 A1 Jun. 5, 2003

Related U.S. Application Data

(62) Division of application No. 09/455,026, filed on Dec. 6, 1999, now Pat. No. 6,514,620.

(51) Int. Cl.$^7$ .............................................. C03C 17/00
(52) U.S. Cl. .......................................... 65/60.2; 65/114
(58) Field of Search ............................... 65/60.1, 60.2, 65/60.4, 60.5, 60.51, 60.3, 60.7, 60.8, 63, 114; 204/192.1, 192.11; 205/67, 72, 76, 79

(56) References Cited

U.S. PATENT DOCUMENTS

| | | | |
|---|---|---|---|
| 3,272,986 A | 9/1966 | Schmidt | |
| 3,681,042 A | 8/1972 | Edwards et al. | |

(List continued on next page.)

FOREIGN PATENT DOCUMENTS

| | | |
|---|---|---|
| EP | 0301755 | 2/1989 |
| EP | 0332717 | 9/1989 |
| EP | 0386993 | 9/1990 |
| EP | 0456487 | 11/1991 |
| EP | 0546302 | 6/1993 |
| EP | 0546470 | 6/1993 |
| EP | 0 560 534 A1 | 9/1993 |
| EP | 0567735 | 11/1993 |
| EP | 0622645 | 11/1994 |
| EP | 0717014 | 6/1996 |
| EP | 0722913 | 7/1996 |
| EP | 0747329 | 12/1996 |
| EP | 0 847 965 A1 | 6/1998 |
| GB | 2 279 365 | 1/1995 |
| WO | 9002653 | 3/1990 |
| WO | 9005439 | 5/1990 |
| WO | 9008334 | 7/1990 |
| WO | 94/03331 | 2/1994 |
| WO | 9513189 | 5/1995 |
| WO | WO 01/21540 | 3/2001 |

OTHER PUBLICATIONS

US 4,960,645, 10/1990, Lingle et al. (withdrawn).
U.S. patent application S.N. 09/455,026, filed Dec. 6, 1999.
U.S. patent application S.N. 09/778,949, filed Feb. 8, 2001.
U.S. patent application S.N. 09/793,404, filed Feb. 27, 2001.
ASTM Designation: E 424–71 Standard Test Methods for Solar Energy Transmittance and Reflectance (Terrestrial) of Sheet Materials.
"Principles of Design of Architectural Coatings", Applied Optics vol. 22, No. 24, Dec. 15, 1983.

(List continued on next page.)

Primary Examiner—Steven P. Griffin
Assistant Examiner—Carlos Lopez
(74) Attorney, Agent, or Firm—Nixon & Vanderhye P.C.

(57) ABSTRACT

A neutral blue-green heat treatable and matchable glass laminate or I.G. unit employs a layer system whose visible transmittance increases by at least 4% during heat treatment and whose $\Delta E^*_{ab}$ is less than about 3.0 and $\Delta a^*$ is less than about 0.7. The sputter coated layer system includes a silver layer sandwiched between nichrome layers and thereafter layers of $Si_3N_4$.

18 Claims, 1 Drawing Sheet

U.S. PATENT DOCUMENTS

| | | | |
|---|---|---|---|
| 3,798,146 | A | 3/1974 | Chong et al. |
| 3,826,728 | A | 7/1974 | Chambers et al. |
| 3,935,351 | A | 1/1976 | Franz et al. |
| 4,166,018 | A | 8/1979 | Chapin et al. |
| 4,179,181 | A | 12/1979 | Chang |
| 4,413,877 | A | 11/1983 | Suzuki et al. |
| 4,462,883 | A | 7/1984 | Hart |
| 4,594,137 | A | 6/1986 | Gillery et al. |
| 4,680,742 | A | 7/1987 | Yamada et al. |
| 4,715,879 | A | 12/1987 | Schmitte et al. |
| 4,769,291 | A | 9/1988 | Belkind et al. |
| 4,780,372 | A | 10/1988 | Tracy et al. |
| 4,790,922 | A | 12/1988 | Huffer |
| 4,799,745 | A | 1/1989 | Meyer et al. |
| 4,816,034 | A | 3/1989 | Bhatt et al. |
| 4,826,525 | A | 5/1989 | Chesworth et al. |
| 4,857,094 | A | 8/1989 | Groth et al. |
| 4,948,482 | A | 8/1990 | Kobayashi et al. |
| 4,954,232 | A | 9/1990 | Yamada et al. |
| 4,965,121 | A | 10/1990 | Young et al. |
| 5,062,937 | A | 11/1991 | Komuro |
| 5,188,887 | A | 2/1993 | Lingle et al. |
| 5,229,194 | A | 7/1993 | Lingle et al. |
| 5,242,560 | A | 9/1993 | Lingle et al. |
| 5,344,718 | A | 9/1994 | Hartig et al. |
| 5,376,455 | A | 12/1994 | Hartig et al. |
| 5,377,045 | A * | 12/1994 | Wolfe et al. ................ 359/585 |
| 5,403,458 | A | 4/1995 | Hartig et al. |
| 5,514,476 | A | 5/1996 | Hartig et al. |
| 5,543,229 | A | 8/1996 | Ohsaki et al. |
| 5,557,462 | A | 9/1996 | Hartig et al. |
| 5,563,734 | A | 10/1996 | Wolfe et al. |
| 5,584,902 | A * | 12/1996 | Hartig et al. ................ 65/32.4 |
| 5,688,585 | A | 11/1997 | Lingle et al. |
| 5,770,321 | A | 6/1998 | Hartig et al. |
| 5,837,108 | A | 11/1998 | Lingle et al. |
| 6,159,607 | A * | 12/2000 | Hartig et al. ............... 428/426 |
| 6,280,834 | B1 * | 8/2001 | Veerasamy et al. .......... 428/217 |
| 6,312,808 | B1 * | 11/2001 | Veerasamy et al. .......... 428/408 |
| 6,335,086 | B1 * | 1/2002 | Veerasamy .................. 428/217 |
| 6,368,664 | B1 * | 4/2002 | Veerasamy et al. ...... 427/249.7 |
| 6,447,891 | B1 * | 9/2002 | Veerasamy et al. .......... 428/216 |
| 6,461,731 | B1 * | 10/2002 | Veerasamy et al. .......... 428/408 |
| 6,472,017 | B2 * | 10/2002 | Veerasamy et al. ...... 427/249.7 |
| 6,475,626 | B1 * | 11/2002 | Stachowiak .................. 428/428 |
| 6,495,251 | B1 * | 12/2002 | Arbab et al. ................. 428/336 |
| 6,495,263 | B2 * | 12/2002 | Stachowiak .................. 428/428 |
| 6,514,620 | B1 * | 2/2003 | Lingle et al. ................ 428/428 |
| 6,524,714 | B1 * | 2/2003 | Neuman et al. ............. 428/428 |
| 6,531,182 | B2 * | 3/2003 | Veerasamy et al. ...... 427/249.7 |
| 6,558,800 | B1 | 5/2003 | Stachowiak |
| 6,576,349 | B2 | 6/2003 | Lingle et al. |
| 6,586,102 | B1 * | 7/2003 | Stachowiak .................. 428/432 |
| 6,589,658 | B1 * | 7/2003 | Stachowiak .................. 428/432 |
| 6,596,399 | B2 * | 7/2003 | Veerasamy .................. 428/432 |
| 6,602,608 | B2 * | 8/2003 | Stachowiak .................. 428/432 |
| 6,605,358 | B1 * | 8/2003 | Stachowiak .................. 428/432 |
| 6,623,846 | B2 * | 9/2003 | Laird .......................... 428/216 |
| 6,638,570 | B2 * | 10/2003 | Veerasamy ............... 427/249.7 |
| 2002/0192473 | A1 | 12/2002 | Gentilhomme et al. |

OTHER PUBLICATIONS

"Performance and Sputtering Criteria of Modern Architectural Glass Coatings" SPIE vol. 325, Optical Thin Films (1982).

EPO Search Report, EP 96 10 4113.

AIRCO Super–E III Coating Process Release.

AIRCO Super–E IV Technology Process Release, p. 1–23.

1991 Proposed ASTM Standard Test Method for Measuring and Calculating Emittance of Architectural Flat Glass Products Using Radiometric Measurements.

U.S. patent application Ser. No. 10/246,746 filed Sep. 19, 2002.

"Heat Insulating Glass Which Can Be Thermally Worked", Hironobu, 05124839, Oct. 1991.

* cited by examiner

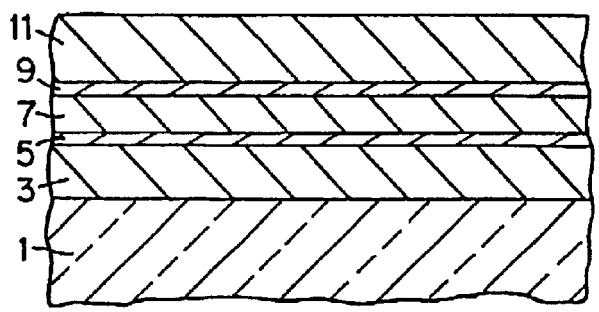
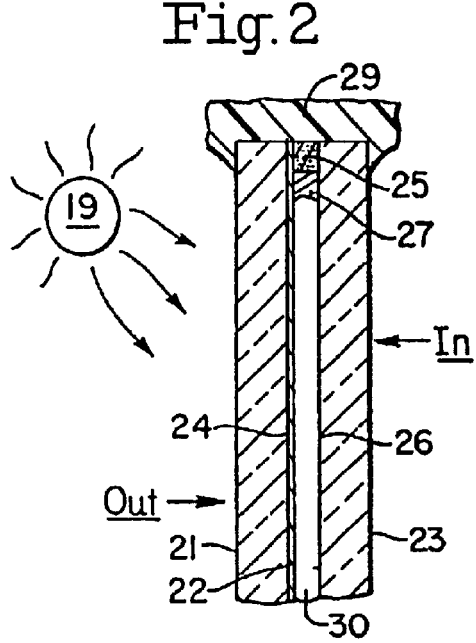
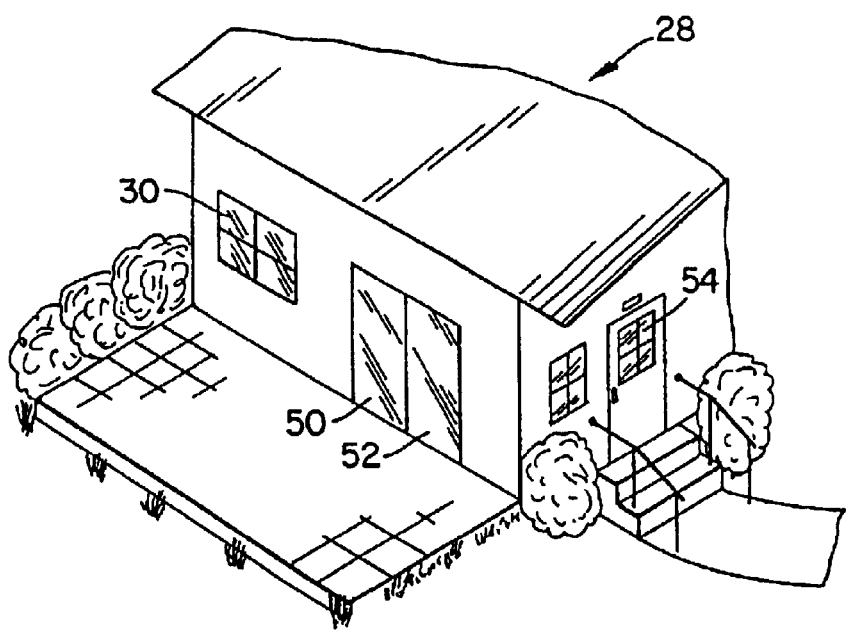
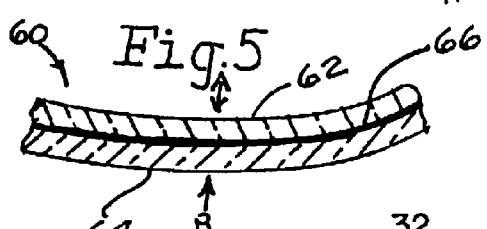
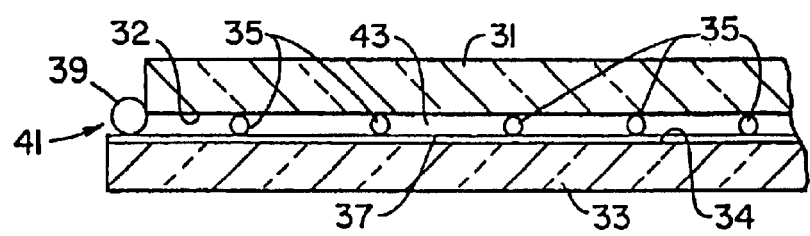

METHOD OF MAKING MATCHABLE LOW-E I.G UNITS AND LAMINATES

This application is a division of application Ser. No. 09/455,026, filed Dec. 6, 1999, now U.S. Pat. No. 6,514,620 the entire content of which is hereby incorporated by reference in this application.

This invention relates to insulating glass units and laminates having sputter-coated layer systems thereon. More particularly, this invention relates to such articles which are heat treatable and are matchable with their unheat treated counterpart.

BACKGROUND OF THE INVENTION

In U.S. Pat. No. 5,688,585 (having overlapping inventorship herewith) there is disclosed a significant step forward in the art of coating glass sheets used for solar management purposes which must be matchable in appearance after heat treatment with their unheat treated counterpart. In this patent it was accurately reported that, for the non-silver containing layer systems of that invention, if $\Delta E$ was maintained below a certain minimal value no greater than about 2.0, the heat treatable, non-silver containing layer systems therein would be matchable. The subject invention constitutes an improvement upon the invention of the aforesaid '585 patent.

In contrast to the '585 patent, the subject invention herein provides a silver containing layer system which avails itself of the solar management advantages of silver. By the discovery that if certain parameters in addition to $\Delta E$ are maintained within certain limits, as described below, it has now been surprisingly found that silver in rather substantial thicknesses may be employed while still achieving heat treatability and matchability if the layer systems are employed in either insulating glass units (I.G. units) or laminates (or other similar articles having two or more light transmitting substrates of glass). It is understood, of course, that a noncoated substrate as contemplated herein may be either glass or an equivalent thereof, such as a transparent plastic material. Moreover, it is a further discovery of this invention that matchability in such articles is achievable even though the coated monolithic glass substrate employed, while heat treatable, is not in and of itself matchable.

The need for matchability is well known in the glass window, door and windshield arts, as is the need for heat treatability. Glass substrates, normally sheet glass used for windows, doors, etc. are often produced in large quantities and cut to size in order to fulfill the needs of a particular situation such as a new multi-window and door office building. It is not only desirable in these buildings, but often a necessity in order to conform to various code provisions, that some of the windows and doors be heat treated (i.e. tempered, heat strengthened or bent) while others, principally to save money, need not be, and thus are not heat treated. Still further, such buildings often employ I.G. units and/or laminates for safety and/or thermal control. Obviously the units and/or laminates which are heat treated must match with (i.e. appear in color, and preferably in transmittance and reflectance as well, to be substantially the same as) the unheat treated I.G. units and/or laminates used together in the building, for architectural and aesthetic purposes. In addition, currently, such windows, doors, etc. for many commercial purposes should preferably be of a substantially neutral color, preferably tending to the blue-green side of the spectrum.

Through rigorous trial and error attempts, it has in the past been possible to achieve matchability in systems other than those of the aforesaid '585 patent but only between two different layer systems, one of which is heat treated and the other is not. The necessity of developing and using two different layer systems to achieve matchability creates additional manufacturing expense and inventory needs which are undesirable. The aforesaid invention disclosed in the '585 patent fulfilled a definite need in the art which overcame this problem. However, it could not, in that system, take advantage of the use of silver for its known IR reflectance properties, and still achieve its desired results.

The silver containing layer systems of the invention herein are useful in glass articles which generically may be described as an article or structure which includes at least two glass substrates in light transmitting relationship with each other. Preferred articles include architectural doors and windows, such as laminates and I.G. units, as well as, at times automotive windshields and windows.

As used herein, the term I.G. unit is synonymous with the term "insulating glass unit" and is used according to its conventional and well known meaning in the art. FIGS. 2 and 4 illustrate, schematically, a typical I.G. unit contemplated for use with the coating systems of this invention. Generally speaking, as contemplated herein, I.G. units are comprised of two or more parallel, spaced sheets of glass held in spaced relationship by an appropriate frame structure. The space(s) between the two or more sheets, typically about one-half inch, either has air in it or an inert gas such as argon, or is partially evacuated. Most are provided with a desiccant within the space to prevent "fogging." It is, of course, understood that FIGS. 2 and 4 are merely examples of many types of I.G. units used for thermal and/or sound insulation purposes, as contemplated by this invention.

The term "laminate" is also well understood in the glass art and is used herein according to its well known meaning. Glass laminates normally include two or more unspaced substrates of glass (shaped or unshaped sheets of glass) which, in the instances of this invention will have at least one coating of a layer system of this invention thereon, normally but not always located at the interface of the two sheets. Such laminates may be flat structures (e.g. sheets cut to size) used in windows, doors or windshields, or bent to meet specific architectural or automotive needs. For example, FIG. 5 schematically illustrates, in generic fashion, a typical two sheet (pane) laminate used as a curved window or windshield.

By way of further background related to this invention attention is directed to the discussion of the prior art in the aforesaid '585 patent. With respect thereto, the BOC Group, Inc. (Wolfe et al) as well as two of the inventors hereto (Messrs. Larson and Lingle) for Guardian Industries, and others have hereto reported various layer coating system (some commercial) employing metallic silver sandwiched between layers of nichrome followed by layers of $Si_3N_4$ to achieve either heat treatable or nonheat treatable solar management coating systems. Other examples of such a structure by these inventors include U.S. Pat. Nos. 5,344,718; 5,376,455; 5,514,476 and 5,770,321. The BOC Group's well known Super E-III and Super-E IV coatings are generally referenced in U.S. Pat. Nos. 5,377,045 and 5,563,734 and exemplify such a known generic structure as well.

In this respect the above-referenced '455 patent also achieved some degree of matchability and heat treatability in certain circumstances. Generally speaking, however, this body of prior art, as a whole, did not achieve the full degree of matchability and heat treatability desired for reliability in manufacturing while at the same time achieving durability and the desirable substantially neutral blue-green color and low U-values and/or shading coefficients desired in I.G. units and laminates.

In view of the above it is apparent that there exists a need in the art for a new layer coating system which is of a commercially acceptable color and which is also heat treatable as well as matchable when used in articles employing two or more light transmitting glass substrates in light transmitting relationship one with the other.

It is a purpose of this invention to fulfill this and other needs in the art which will become more apparent to the skilled artisan once given the following disclosure.

SUMMARY OF THE INVENTION

This invention, generally speaking fulfills the above-described needs in the art by providing certain articles which include two or more glass structures in light transmittance communication with each other and which have a unique layer system of this invention on at least one of its surfaces. In addition, this invention further provides a method of making such articles. In this respect then, this invention provides:

In a glass article having at least two glass substrates in light transmitting communication with each other and having a sputter coated heat treatable layer system on at least one of said substrates, which coated substrate is heat treated, the improvement comprising said glass article being matchable and wherein said sputter coated layer system comprises from the glass substrate on which it is coated, outwardly:

a) a layer of silicon nitride;
b) a substantially metallic layer of nickel or nickel alloy having a nickel content of at least about 10% by weight Ni, this layer being substantially free of a nitride or oxide of said metal;
c) a substantially metallic layer of silver;
d) a substantially metallic layer of nickel or a nickel alloy having a nickel content of at least about 10% by weight Ni, this layer being substantially free of a nitride or an oxide of said metal; and
e) a layer of silicon nitride; wherein said heat treated layer coating system has a visible transmittance at least about 4% greater than before it was heat treated, and wherein the relative thicknesses of said layers combine to result in said heat treated coated substrate which when viewed monolithically from the glass side of said coating has a $\Delta E^*_{ab}$ no greater than 5.0 and a $\Delta a^*$ less than 0.8.

In another aspect of this invention there is provided, in the method of making a matchable glass article having at least two glass substrates in light transmitting communication with each other and having a heat treatable sputter coated layer system on at least one surface of a said substrate which coated substrate is heat treated, the improvement comprising the steps of:

a) sequentially sputter coating onto a surface of at least one of the glass substrates a said heat treatable layer system which comprises from the glass substrate on which it is coated, outwardly:
a layer of silicon nitride;
a substantially metallic layer of nickel or nickel alloy having a nickel content of at least about 10% by weight Ni, this layer being substantially free of a nitride or oxide of said metal;
a substantially metallic layer of silver;
a substantially metallic layer of nickel or a nickel alloy having a nickel content of at least about 10% by weight Ni, this layer being substantially free of a nitride or an oxide of said metal; and
a layer of silicon nitride; wherein the relative thicknesses of said layers combine to result in said article when viewed from a glass side having a $\Delta E^*_{ab}$ no greater than 3.0 and a $\Delta a^*$ less than 0.7;

b) subjecting said substrate having said coating thereon to a heat treatment which increases the visible transmittance of said coated substrate by at least about 4%; and c) thereafter fabricating said glass substrates so as to be in light transmitting communication with each other thereby to form said matchable glass article.

In certain preferred embodiments the desired color is substantially neutral but preferably is located in the blue-green quadrant as represented by both a* and b* being negative. In further preferred embodiments of this invention the glass article is a window or door formed from at least two sheets of glass and fabricated as either an I.G. unit or a glass laminate. In this respect the heat treatment employed in the preferred embodiments of this invention is selected from bending, tempering, or heat strengthening, and most preferably is tempering.

This invention will now be described with respect to certain embodiments thereof as illustrated in the following drawings, wherein:

IN THE DRAWINGS

FIG. 1 is a partial side sectional view of an embodiment of a layer system according to this invention.

FIG. 2 is a partial cross-sectional view of an I.G. unit as contemplated by this invention.

FIG. 3 is a partial schematic perspective view of a house employing as a window, door and wall an I.G. unit and laminate according to this invention.

FIG. 4 is a partial cross-sectional schematicized view of an embodiment of an I.G. unit in pre-fabrication stage.

FIG. 5 is a partial cross-sectional schematicized view of a bent laminate as contemplated by this invention.

DETAILED DESCRIPTION OF EMBODIMENTS OF THE INVENTION

Certain terms are prevalently used in the glass coating art, particularly when defining the properties and solar management characteristics of coated glass. Such terms are used herein in accordance with their well known meaning. For example, as used herein:

Intensity of reflected visible wavelength light, i.e. "reflectance" is defined by its percentage and is reported as $R_xY$ (i.e. the Y value cited below in ASTM E-308-85), wherein "X" is either "G" for glass side or "F" for film side. "Glass side" (e.g. "G") means, as viewed from the side of the glass substrate opposite that on which the coating resides, while "film side" (i.e. "F") means, as viewed from the side of the glass substrate on which the coating resides.

Color characteristics are measured and reported herein using the CIE LAB 1976 a*, b* coordinates and scale (i.e. the CIE 1976 a*b* diagram). Other similar coordinates may be equivalently used such as by the subscript "h" to signify the conventional use of the Hunter method (or units) Ill. C, 10° observer, or the CIE LUV u*v* coordinates. These scales are defined herein according to ASTM D-2244-93 "Standard Test Method for Calculation of Color Differences From Instrumentally Measured Color Coordinates" Sep. 15, 1993 as augmented by ASTM E-308-85, Annual Book of ASTM Standards, Vol. 06.01 "Standard Method for Computing the Colors of Objects by Using the CIE System" and/or as reported in IES LIGHTING HANDBOOK 1981 Reference Volume.

The terms "emissivity" and "transmittance" are well understood in the art and are used herein according to their well known meaning. Thus, for example, the term "transmittance" herein means solar transmittance, which is made up of visible light transmittance (TY), infrared energy transmittance, and ultraviolet light transmittance. Total solar energy transmittance (TS) is then usually characterized as a weighted average of these other values. With respect to these transmittances, visible transmittance, as reported herein, is characterized by the standard Illuminant C technique at 380–720 nm; infrared is 800–2100 nm; ultraviolet is 300–400 nm; and total solar is 300–2100 nm. For purposes of emissivity, however, a particular infrared range (i.e. 2,500–40,000 nm) is employed.

Visible transmittance can be measured using known, conventional techniques. For example, by using a spectrophotometer, such as a Beckman 5240 (Beckman Sci. Inst. Corp.), a spectral curve of transmission is obtained. Visible transmission is then calculated using the aforesaid ASTM 308/2244-93 methodology. A lesser number of wavelength points may be employed than prescribed, if desired. Another technique for measuring visible transmittance is to employ a spectrometer such as a commercially available Spectrogard spectrophotometer manufactured by Pacific Scientific Corporation. This device measures and reports visible transmittance directly. As reported and measured herein, visible transmittance (i.e. the Y value in the CIE tristimulus values, ASTM E-308-85) uses the Ill. C., 10° observer.

"Emissivity" (E) is a measure, or characteristic of both absorption and reflectance of light at given wavelengths. It is usually represented by the formula:

$$E = 1 - \text{Reflectance}_{film}$$

For architectural purposes, emissivity values become quite important in the so-called "mid-range", sometimes also called the "far range" of the infrared spectrum, i.e. about 2,500–40,000 nm., for example, as specified by the WINDOW 4.1 program, LBL-35298 (1994) by Lawrence Berkeley Laboratories, as referenced below. The term "emissivity" as used herein, is thus used to refer to emissivity values measured in this infrared range as specified by the 1991 Proposed ASTM Standard for measuring infrared energy to calculate emittance, as proposed by the Primary Glass Manufacturers' Council and entitled "Test Method for Measuring and Calculating Emittance of Architectural Flat Glass Products Using Radiometric Measurements". This Standard, and its provisions, are incorporated herein by reference. In this Standard, emissivity is reported as hemispherical emissivity ($E_h$) and normal emissivity ($E_n$).

The actual accumulation of data for measurement of such emissivity values is conventional and may be done by using, for example, a Beckman Model 4260 spectrophotometer with "VW" attachment (Beckman Scientific Inst. Corp.). This spectrophotometer measures reflectance versus wavelength, and from this, emissivity is calculated using the aforesaid 1991 Proposed ASTM Standard which has been incorporated herein by reference.

Another term employed herein is "sheet resistance". Sheet resistance ($R_s$) is a well known term in the art and is used herein in accordance with its well known meaning. It is here reported in ohms per square units. Generally speaking, this term refers to the resistance in ohms for any square of a layer system on a glass substrate to an electric current passed through the layer system. Sheet resistance is an indication of how well the layer is reflecting infrared energy, and is thus often used along with emissivity as a measure of this characteristic. "Sheet resistance" is conveniently measured by using a 4-point probe ohmmeter, such as a dispensable 4-point resistivity probe with a Magnetron Instruments Corp. head, Model M-800 produced by Signatone Corp. of Santa Clara, Calif.

"Chemical durability" or "chemically durable" is used herein synonymously with the term of art "chemically resistant" or "chemical stability". Chemical durability is determined by boiling a 2"×5" sample of a coated glass substrate in about 500 cc of 5% HCl for one hour (i.e. at about 220° F.). The sample is deemed to pass this test (and thus the layer system is "chemically resistant" or is deemed to be "chemically durable" or to have "chemical durability") if the sample's layer system shows no visible discoloration or no pinholes greater than about 0.003" in diameter after this one hour boil.

"Mechanical durability" as used herein is defined by the following test. The first test uses a Pacific Scientific Abrasion Tester (or equivalent) wherein a 2"×4"×1" nylon brush is cyclically passed over the layer system in 500 cycles employing 150 gm of weight, applied to a 6"×17" sample. In this test, if no substantial, noticeable scratches appear when viewed with the naked eye under visible light, the test is deemed passed, and the article is said to be "mechanically durable" or to have "mechanical durability".

Thicknesses of the various layers in the systems reported are measured by, and thus the term, "thickness" as used herein is defined by, alternative techniques. In one technique, known optical curves, or, in the alternative, the use of conventional needle profilometery is employed. In another and particularly advantageous technique, an multiwavelength, variable angle spectrophotometric ellipsometer made by J. A. Woollam Co., Lincoln, Nebr., is used.

The term "U-value" (synonymous with "thermal transmittance") is a term well understood in the art and is used herein according to this well known meaning. "U-value" herein is reported in terms of $BTU/hr/ft^2/°F$., and may be determined according to the guarded hot box method as reported in, and according to ASTM designation: C236-89 (reapproved 1993).

The term "shading coefficient" is a term well understood in the art and is used herein according to its well known meaning. It is determined according to ASHRAE Standard 142 "Standard Method for Determining and Expressing the Heat Transfer and Total Optical Properties of Fenestration Products" by ASHRAE Standards Project Committee, SPC 142, September 1995.

In order to properly employ the term "heat treatable" (or its synonym "heat treatability") when used as a characteristic of this invention, it must be defined more narrowly than heretofore employed in the prior art as represented by the aforesaid '585 patent. Here, as in the prior art, the term continues to refer to the ability of the coated layer system to withstand the type of heat treatment to which it is subjected without adverse affect upon its required characteristics. However, to be "heat treatable" (or to have "heat treatability") for the purposes of this invention, the heat treatment to which the layer coating system is subjected must also increase visible transmittance by at least about 4% and preferably by about 5–7%. It is a finding of this invention that this increase is important in order to achieve "matchability" or to be "matchable" as these two terms are employed herein for most of the layer systems contemplated herein.

Provided that the heat treatment results in this increased visible transmittance, then, in all other respects the definition of "heat treatable" and "heat treatability" remains the same as heretofore employed in the art (e.g. as in the '585 patent referenced above). For example, such heat treatments as generally contemplated herein may be any process which employs relatively high temperatures and which in the normal circumstance would adversely affect most prior art coatings. Such heat treatments include tempering, bending, heat strengthening and certain processes used to form I.G. units or glass laminates which employ high sealing or fabricating temperatures. Such heat treatments, e.g. tempering and bending, often necessitate heating the coated substrate to temperatures above 1100° F. (593° C.) and up to 1450° F. (788° C.) for a sufficient period of time to insure the end result.

Tolerable, so as to be included within the definition of "heat treatable", are changes for the better in the layer system resulting from the heat treatment employed. In addition to increased visible transmittance, such heat treatments for example, may beneficially result in lower emissivity and sheet resistance values. Such beneficial changes do not render the layer systems of this invention nonheat treatable. For most commercial purposes, for example, an emissivity change for the better (i.e. lowering of the E value) due to the heat treatment is not only tolerated but desirable because it does not affect visual appearance and thus matchability, although it is normally important that the change take place uniformly across the substrate and is independent of the parameters used to perform the heat treatment.

The term "matchable" and its definition as used herein, then follows from the term (and definition above, of) "heat treatable". As contemplated by this invention the term "matchable" simply means that a glass article having at least two glass substrates in light transmittance relationship with each other, wherein at least one of the glass substrates has a sputter coated layer coating system of this invention on it, will appear to the naked human eye to look substantially the same when comparing its unheat treated appearance to its appearance after heat treatment, at least when viewed from the so-called glass side (i.e. looking through at least one substrate of glass before viewing the coating).

The glass articles contemplated by this invention are not monolithic glass sheets. Rather as described above, they are articles which comprise at least two glass substrates (e.g. sheets) which are in light transmitting (and thus reflecting) relationship with one another. The usual form of such an article is, of course, an I.G. unit or laminate.

While the coating systems of this invention are monolithically heat treatable, they need not be and often are not, monolithically matchable. In fact many systems herein contemplated only achieve matchability when used in a dual or multi-glass substrate structure as described. While the precise reason for this may not be fully understood, it is believed, and thus is a finding of this invention, that by using two or more glass substrates located in transmitting (and thus reflecting) relationship with one another, the reflection of visible light from the glass substrate opposite the viewed substrate tends to mask or cancel any difference in appearance between the heat treated, coated substrate being viewed when compared to its unheat treated counterpart. It is further believed that when the light transmittance of the coatings of this invention increase during heat treatment, this enhances the aforesaid masking affect, thus further cancelling any difference.

It, therefore, becomes an unexpected beneficial characteristic of this invention due to this masking effect, that, as aforesaid, the heat treated coated substrate if employed monolithically, i.e. compared to itself when unheat treated, need not be matchable in order to achieve matchability in the articles of this invention. This, in turn, creates the substantial benefit of not imposing upon the heat treated substrate the heretofore believed necessary characteristic of having to employ a $\Delta E$ less than 2.0. Rather, as described below the $\Delta E$ of the monolithic (individual) substrate may be substantially higher than 2.0 and matchability still be achieved in the dual or multipane articles of this invention.

It is a still further finding of this invention for the articles and systems herein contemplated that matchability is best definable by reference to certain characteristics in addition to $\Delta E$. It has now been surprisingly found, in fact, that for matchability of the systems herein, a limit upon $\Delta a^*$ should be defined. Preferably, and optionally, the color may also be defined to maximize the degree of matchability achieved. This color, of course, may be conveniently described by reference to the aforesaid conventional $a^*$, $b^*$ values, which for the purposes of this invention, to maintain the color in the desired substantially neutral color range tending to the blue-green quadrant, should both be negative. If the color desired is different, then the $a^*b^*$ values will change accordingly to meet the customer's needs while still maintaining matchability through the appropriate selection of a particular $\Delta E$ and $\Delta a^*$.

Closely related to the above findings is the still further finding of this invention that in achieving matchability for any particular layer system herein, particularly if colors other than relatively neutral blue-green are desired, that the following general guidelines be followed:

a) the range of $\Delta E$ needed to insure matchability generally varies depending upon the color quadrant in which the color resides; and b) the so-called $b^*$ component when defining the color by its $a^*b^*$ coordinates is less important to control than is the $a^*$ component, and thus $\Delta a^*$.

The term "delta E" (i.e. "$\Delta E$") is well understood in the art and is reported, along with various techniques for determining it, in the aforesaid ASTM-2244-93 as well as being reported in Hunter et al, *The Measurement of Appearance*, 2nd Ed. Cptr. Nine, p162 et seq. [John Wiley & Sons, 1987].

As used in the art, "$\Delta E$" is a way of adequately expressing the change (or lack thereof) in reflectance and/or transmittance (and thus color appearance, as well) in an article. $\Delta E$ may be calculated by the "ab" technique, by the Hunter technique (designated by employing a subscript "H") and/or by the Friele-MacAdam-Chickering (FMC-2) technique. All are deemed useful, and equivalent for the purposes of this invention. For example, as reported in *Hunter et al* referenced above, the rectangular coordinate/scale technique (CIE LAB 1976) known as the $L^*$, $a^*$, $b^*$ scale may be used, wherein:

$L^*$ is (CIE 1976) lightness units $a^*$ is (CIE 1976) red-green units $b^*$ is (CIE 1976) yellow-blue units and the distance $\Delta E$ between $L^*_o$ $a^*_o$ $b^*_o$ and $L^*_1$ $a^*_1$ $b^*_1$ is the rectangular coordinates:

$$\Delta E^*_{ab} = [(\Delta L^*)^2 + (\Delta a^*)^2 + (\Delta b^*)^2]^{1/2}$$

where:

$\Delta L^* = L^*_1 - L^*_o$ $\Delta a^* = a^*_1 - a^*_o$ $\Delta b^* = b^*_1 - b^*_o$ In this technique, as used in this invention, the subscript "o" represents the coating (coated article) before heat treatment and the subscript "1" represents the coating (coated article) after heat treatment.

When hereinafter, and in the claims, the term ΔE is quantified, the numbers employed are those calculated by the aforesaid (CIE LAB 1976) L*, a*,b* coordinate technique and thus ΔE is recited as $\Delta E^*_{ab}$. However, within the scope of this invention and the quantification of ΔE are, of course, the equivalent numbers if converted to those calculated by any other technique employing the same concept of ΔE as defined above.

As a general guideline, in this respect, then, it has been found that, for the layer systems as contemplated by this invention, when the coated monolithic glass substrate has a color before heat treatment falling within the following range:

|  | General (about) | Preferred (about) |
|---|---|---|
| a* | −2.6 to −6.0 | −3.6 to −5.0 |
| b* | −3.5 to −9.5 | −5.5 to −7.5 |

"matchability" (i.e. to be "matchable") is usually achieved in articles of this invention when viewed from the glass side if the heat treatment results in an increase in visible light transmittance of at least about 4% and preferably about 5–7% and if monolithically:

|  | General (about) | Preferred |
|---|---|---|
| $\Delta E^*_{ab}$ is | ≦5.0 | <4.0 |
| Δa* is | <0.8 | <0.5 |

A $\Delta E^*_{ab}$ and Δa* of zero is, of course, the ideal situation which the skilled artisan should strive for.

The term "about" is used in the above ranges and herein generally, to take into account minor variations that may occur depending upon the precise layer system employed, the somewhat subjective nature of the human eye and in recognition of the fact that the definition of "matchable" is similarity of appearance to the naked eye for the purpose intended, as well as the understanding that ΔE and Δa* are scientific techniques for describing this concept as it relates to the human eye.

As a further guideline, and due to the above-described masking effect of appropriately positioned glass substrates as contemplated herein, a monolithic sheet provided with a coating of this invention and employed as one of two or more substrates in the articles herein contemplated, may now have a ΔE greater than hereinbefore thought tolerable for matchability. In fact it has been surprisingly found that the monolithic heat treatable coated glass sheet need only have a $\Delta E^*_{ab}$ less than about 5.0 and preferably less than about 4.0 to obtain matchability in the final product. Moreover, as a further general guideline, the corresponding Δa* in this sheet need only be less than about 0.8 and preferably less than about 0.5.

Turning now to FIG. 1, there is illustrated a partial cross-sectional view of a typical embodiment of a heat treatable glass substrate having a sputter coated layer system thereon according to this invention. Therein glass substrate 1 has provided on it an undercoat 3 of $Si_3N_4$, a first intermediate layer 5 of a non-nitrided and nonoxidized nickel or nickel alloy (preferably a nichrome of, by weight percent, 80/20 nickel), an infrared energy reflecting layer 7 of silver, a second intermediate layer 9 of a non-nitrided and nonoxidized nickel or nickel alloy (preferably a nichrome of, by weight percent, 80/20 nickel/chromium) and a top layer 11 of $Si_3N_4$.

The thicknesses of these layers may vary and in this respect useful ranges thereof for certain embodiments are given below. It is understood that it is, generally speaking, the relative thicknesses of the system, which in general are chosen to achieve the desired results herein.

While the layer systems of this invention find use in the automotive window and windshield arts, they are particularly useful as solar management coatings in the so-called architectural field (i.e. windows and doors for building structures such as office buildings, apartments, and residential houses). When so employed in the architectural field, they are employed, normally but not necessarily for their matchability in multi-pane insulating glass units ("I.G. units") such as of the type illustrated in FIGS. 2 and 4, or as doors and windows in residential homes as illustrated in FIG. 3, or as in laminates as illustrated in FIG. 5.

FIG. 3 is a schematic view of a typical family dwelling 28 having various portals in which the subject invention may be employed. For example, an unheat treated window 30 may employ as a "storm window" or noise abating system, an I.G. unit of this invention such as is illustrated in FIG. 2. Sliding door 50 or non-sliding glass door panel 52 as well as front door panel 54 may be so constructed by employing this invention as a heat treated I.G. unit. This requires that matchability be achieved between the heat treated and unheat treated windows/doors for obvious aesthetic reasons. Matchability, of course, is here achieved by the use of layer system 24 according to this invention.

With reference to FIG. 2, there is illustrated, somewhat schematically, a typical I.G. unit in accordance with this invention. In order to differentiate the "inside" of the I.G. unit (labelled "In") from its "outside" (labelled "Out"), the sun 19 is schematically presented. As can be seen, such an I.G. unit is made up of "outside" glass pane (sheet) 21 and "inside" glass pane (sheet) 23. These two glass panes (e.g. float glass of 2 mm–8 mm thick) are sealed at their peripheral edges by a conventional sealant 25 and are provided with a conventional desiccant strip 27. The panes are then retained in a conventional window or door retaining frame 29 (shown in partial schematic form). By sealing the peripheral edges of the glass sheets and replacing the air in chamber 30 with a gas such as argon, a typical, high insulating value I.G. unit is formed. Chamber 20 in this respect is typically about ½" in width. Either inner wall 24 or 26 (or both) may be provided with a layer system of this invention. As illustrated, inner wall 24 of outside glass sheet 21 in this embodiment, has been provided with a sputter-coated layer coating system 22 applied thereto using conventional sputter coating techniques. As can be seen, such a system effectively includes the "masking" principle discovered as a part of this invention since, for example, an observer of the home from the outside will look through pane 21, coating 24, space 30 and pane 23. However, in doing so, because some of the sunlight passing through pane 21 and striking pane 23 is reflected back from pane 23, reaching the observer's eye, the masking effect helps to neutralize any small difference that might have otherwise existed (e.g. if the windows/doors were monolithic sheets) thereby to create the desired matchability.

Attention is now directed to FIG. 4 wherein there is schematically illustrated a typical two-pane I.G. unit stack prior to sealing. In the I.G. unit of FIG. 4, the prestack employs two typical, clear float glass sheets 31 and 33 separated a selected distance (e.g. 0.1 mm) by glass beads 35. Lower sheet 33, of slightly larger size than upper sheet 31, has a layer system 37 according to this invention sputter coated by conventional techniques onto its inner planar surface 34. Optionally, the inner planar surface 32 of sheet 31 may be used for the layer coating, or both surfaces 32 and 34 may be so employed. A conventional sealant 39 (e.g. a relatively low melting ceramic) is then provided in the peripheral area 41 defined by centering the smaller sheet 31 on the larger sheet 33.

In conventional fashion, sufficient heat is then applied so as to cause sealant 39 to flow and seal the two sheets together thereby to create an insulating chamber 43. Thereafter, after cool down, a vacuum is applied to remove as much air and water vapor as is economically feasible, and optionally to either leave a vacuum or replace the air and water vapor with an inert gas such as Argon. In an alternative technique the edges of the glass are flame sealed, rather than using a sealant. In either instance, heat must be applied to create the seal and drive off the water vapor. Thus the heat treatable embodiments of this invention find unique applicability in I.G. units of the type shown in FIG. 4 wherein the layer system must be able to withstand the heat employed during sealing without adversely affecting its desired characteristics.

In yet another alternative, a vacuum process is not employed and a spacing of ½" for the chamber is effected by various known, conventional techniques. In such a process the insulating chamber is usually filled with Argon so as to displace the air and any water vapor (i.e. humidity or moisture) that might be present. In both situations the use of two (or more, if tri-pane I.G.'s are built) sheets, positioned in light transmitting relationship one with respect to the other, brings into being the masking effect such that the I.G. unit is matchable even if, monolithically, pane 21 is not, due to too high ΔE.

In this respect, the term "heat treatable" as used herein includes those I.G. unit sealing techniques which employ sufficiently high temperatures that would normally adversely affect or destroy a conventional layer system, but does not include those sealing techniques which employ such low temperatures so as to not affect virtually all coatings used for this purpose.

When forming most I.G. units, multiple "handling" steps are often required, thus necessitating a layer system which is mechanically durable. Moreover, due to the nature of the process and materials employed, chemical durability is required. The preferred embodiments of the layer systems of this invention achieve both chemical and mechanical durability, thus making them particularly useful in forming I.G. units having excellent U-values and other solar management properties, while at the same time being matchable.

The preferred processes and apparatus used to form the layer coating systems of this invention may be any known, conventional sputter-coating system. An example of such systems are the multi-chamber systems produced by Airco, Inc., such as the G-49 large area flat glass sputter coater made by this company. It is to be noted here that it is an aspect of this invention that its unique results are achieved through the use of conventional sputter-coating techniques without the need for special processes to relieve intrinsic stresses as reported in U.S. Pat. No. 5,377,045.

Attention is now directed to FIG. 5 which, in partial cross-sectional form, illustrates a typical bent laminate 60 according to this invention. It is understood, of course, that laminate 60 need not be bent, i.e. it could be flat. Since laminate 60 is bent, however, it often will be required to be matchable with its unbent counterpart, such as in the case where it is used as a bent skylight in house 28 (not shown), which then must match with windows and doors 50, 52, etc. which may themselves be bent or flat (as illustrated).

Laminate 60 includes two panes of clear glass 62, 64 respectively, which are sealed together in conventional fashion. Either or both of the inner facial surfaces of panes 62, 64 have, before fabrication and bending, sputter coated thereon a layer system 66 according to this invention. The laminate is then constructed and bent, as by heat slumping at the slumping temperature of the glass on a form sled or cradle (sometimes referred to as a "coffin") in conventional fashion to form the curved laminated article which thereafter may be provided with a conventional frame member (not shown for convenience). During bending, the transmittance of the coated pane(s) increases by at least about 4% to insure matchability.

As can be seen, pane 62 and pane 64 are positioned to be in light transmitting relationship one to the other. Therefore, no matter which side ("A" or "B" in FIG. 5) of the laminate one views the structure from the masking effect of reflection from the pane opposite the viewer (e.g. pane 62 if the viewer is on side "B" helps achieve matchability of the unit although the pane(s) with the coating on it, by itself, is not necessarily matchable, although it may be. Preferably only one pane is coated, the other being uncoated. It is also considered a part of this invention that more than two substrates may be present in the laminate, as well as that at least one of them may be tempered or heat strengthened, as well as bent.

As illustrated in FIG. 1, the substrate 1 is preferably glass or an equivalent and the preferred layer systems of this invention consist essentially of five (5) layers. While other layers may be employed, they must not significantly detract from the characteristic of at least "matchability" herein achieved by these five layers. With reference to the numerals in FIG. 1, the following range of thicknesses have been found to be desirable for insuring the achievement of "matchability" and heat treatability, and in most instances the other characteristics as well, as noted below.

| FIG. 1 Layer No. | "About" Thickness (Å) | Preferred Thickness (Å) |
| --- | --- | --- |
| 3 | 310–350 | 330 |
| 5 | 10–20 | 13 |
| 7 | 52–62 | 57 |
| 9 | 10–20 | 12 |
| 11 | 390–440 | 410 |

With regard to layers 3 and 11 which consist essentially of $Si_3N_4$, the target of Si employed to form this layer system (in a nitrogen environment as known in the art) may be admixed with up to 6% by weight aluminum or stainless steel (e.g. SS#316), with about this amount then appearing in the layer so formed. While layers 5 and 9 may be metallic nickel, a nichrome preferably consisting essentially of, by weight about 80–90% Ni and 10–20% Cr, may be employed. Moreover, while it is perhaps possible to employ certain other IR reflecting metals as layer 7, such as gold or platinum, the preferred layer 7 herein consists essentially of metallic silver, the others being considered a less desirable equivalent so long as they achieve the desired result.

An example of layers 5 and 9 include not only SS-316 which consists essentially of 10% Ni and 90% other ingredients, mainly Fe and Cr, but Haynes 214 alloy as well, which by weight consists essentially of (as a nominal composition):

| Element | Weight % |
|---|---|
| Ni | 75.45 |
| Fe | 4.00 |
| Cr | 16.00 |
| C | .04 |
| Al | 4.50 |
| Y | .01 |

It is believed important to the achievement of maximized chemical durability that layers 5 and 9 include at least 10% by weight nickel, and that these layers be present in substantially unoxidized form (or have undergone only a minor amount of oxidation) and are preferably, substantially free of a nitride of the nickel or chromium or other metallic elements employed.

For most embodiments contemplated by this invention, the following characteristics will be present in a monolithic glass sheet useful in an I.G. unit to create matchability when using the layer system above-described, sputter coated onto one of its flat surfaces within the range of thicknesses as set forth above. The characteristics reported are based upon a glass substrate formed of clear, conventional float glass (i.e. made by the conventional float process) having a thickness of 6 mm. For glasses of different thicknesses or if colored, certain thickness dependent characteristics as known in the art, will change accordingly.

| | MONOLITHIC SHEET (6 mm THICK) | | |
|---|---|---|---|
| CHARACTERISTIC | RANGE | PREFERRED RANGE | SPECIFIC EXAMPLE |
| TY (%) | | | |
| before h.t. | 63–73 | 67–72 | 70 |
| after h.t. | 68–78 | 72–77 | 75 |
| $R_GY$ (%) | | | |
| before h.t. | 7–13 | 8–12 | 10 |
| after h.t. | 7–13 | 8–12 | 8 |
| a* | | | |
| before h.t. | −2.6 to −6.0 | −3.6 to −5.0 | −4.3 |
| after h.t. | −2.3 to −6.3 | −3.3 to −5.3 | −4.3 |
| b* | | | |
| before h.t. | −3.5 to −9.5 | −5.5 to −7.5 | −6.5 |
| after h.t. | −4.5 to −10.5 | −6.4 to −9.0 | −7.7 |
| $R_fY$ (%) | | | |
| before h.t. | 3–7 | 4–6 | 5.0 |
| after h.t. | 2–6.4 | 3–5.4 | 4.2 |
| a* | | | |
| before h.t. | +1.4 to −3.4 | +0.4 to −2.4 | −1.0 |
| after h.t. | −0.6 to −6.0 | −1.6 to −5.0 | −3.3 |
| b* | | | |
| before h.t. | +2.5 to −6.5 | +0.5 to −4.5 | −2.0 |
| after h.t. | −3 to −12 | −5.0 to −10.0 | −7.5 |
| $E_n$ | | | |
| before h.t. | 0.16–0.25 | 0.18–0.22 | 0.20 |
| after h.t. | 0.18–0.23 | 0.16–0.20 | 0.18 |

-continued

| | MONOLITHIC SHEET (6 mm THICK) | | |
|---|---|---|---|
| CHARACTERISTIC | RANGE | PREFERRED RANGE | SPECIFIC EXAMPLE |
| $E_h$ | | | |
| before h.t. | 0.17–0.26 | 0.19–0.23 | 0.21 |
| after h.t. | 0.15–0.24 | 0.17–0.21 | 0.19 |
| $R_s$ (ohms/sq) | | | |
| before h.t. | 15–20 | 15.5–18.5 | 17.0 |
| after h.t. | 10–20 | 11.5–14.5 | 13.0 |
| $\Delta E^*_{ab}$ | <5.0 | <4.0 | 3.6 |
| $\Delta a^*$ | <0.8 | <0.5 | 0.0 |

In the above table, TY is visible transmittance, "h.t." means heat treatment (here tempering), RY is reflectance, subscript "f" means film side (i.e. coating side) and subscript "G" means glass side. The a* and b* numbers are the color coordinates as measured according to the above-described CIE LAB 1976, Ill.C.10° observer technique, $E_n$ is normal emissivity, $E_h$ is hemispherical emissivity and $R_s$ is sheet resistance, here reported in ohms per square, $\Delta E^*_{ab}$ and $\Delta a^*$ are here used as defined above.

As can be seen in the specific example given in the above table, $\Delta E^*_{ab}$ is 3.6. Even though $\Delta a^*$ is a very acceptable 0.0, this $\Delta E$ value is too large for the monolithic sheet to itself achieve matchability (i.e comparing its heat treated form to its unheat treated form, monolithically). However, when this specific example is employed in an I.G. unit or laminate, the difference between the heat treated form and unheat treated form is masked and the two ultimate products are matchable.

EXAMPLE NO. 2

As another example of the heat treatability and matchability of the subject invention, another sheet of 6 mm clear float glass is coated with a layer system according to this invention and cut so as to form two glass panes useful in two separate I.G. units of ½" air gap each employing another annealed clear float glass sheet of 6 mm thickness. One of the coated cut sheets is then tempered in a conventional tempering furnace at about 1265° F. for three minute cycles and quenched to room temperature.

Coating layer thickness measurements are made according to the ellipsometer (J. A. Woollam Co.) technique described above. The coater employs five isolated coating zones, only three zones being used, in conventional fashion, and the operational setup for each is as follows:

| GENERAL SETUP | | | | | |
|---|---|---|---|---|---|
| | Coat Zone | | | | |
| | CZ-1 | CZ-2 | CZ-3 | CZ-4 | CZ-5 |
| Material | Ti | Ti | Si* | NiCr Ag | NiCr Si* |
| Power | Off | Off | On | On On | On On |

-continued

GENERAL SETUP

| | Coat Zone | | | | | | |
|---|---|---|---|---|---|---|---|
| | CZ-1 | CZ-2 | CZ-3 | | CZ-4 | | CZ-5 |
| Gases | Off | Off | On | On | On | On | On |
| Linespeed | 200 in/min | | | | | | |

*As aforesaid this target is doped with approximately 5%–11% Al for ease of sputtering which in the nitrogen environment employed results in AlN being formed as a component having very similar optical properties to $Si_3N_4$. The occurrence or nonoccurrence of AlN in the coatings of this invention have been found to be insignificant and thus fully optional for ease of sputtering only.

COAT ZONE #1, PROCESS PARAMETERS:

| | Cathode # | | | | | |
|---|---|---|---|---|---|---|
| | 1 | 2 | 3 | 4 | 5 | 6 |
| Material | Ti | Ti | Ti | Ti | Ti | Ti |
| Type | C-Mag | C-Mag | C-Mag | C-Mag | C-Mag | C-Mag |
| Gas | Argon | Oxygen | Nitrogen | | | |
| Flow, sccm | 0 | 0 | 2000 | | | |
| Pressure | 2.5 × 10-3 torr | | | | | |
| Power, kW | Off | Off | Off | Off | Off | Off |
| Linespeed | 200 in/min | | | | | |

COAT ZONE #2, PROCESS PARAMETERS:

| | Cathode # | | | | | |
|---|---|---|---|---|---|---|
| | 7 | 8 | 9 | 10 | 11 | 12 |
| Material | Ti | Ti | Ti | Ti | Ti | Ti |
| Type | C-Mag | C-Mag | C-Mag | C-Mag | C-Mag | C-Mag |
| Gas | Argon | Oxygen | Nitrogen | | | |
| Flow, sccm | 0 | 0 | 1700 | | | |
| Pressure | 2.5 × 10-3 torr | | | | | |
| Power, kW | Off | Off | Off | Off | Off | Off |
| Linespeed | 200 in/min | | | | | |

COAT ZONE #3, PROCESS PARAMETERS:

| | Cathode # | | | | | |
|---|---|---|---|---|---|---|
| | 13 | 14 | 15 | 16 | 17 | 18 |
| Material | Si | Si | Si | Si | Si | Si |
| Type | C-Mag | C-Mag | C-Mag | C-Mag | C-Mag | C-Mag |
| Gas | Argon | Nitrogen | | | | |
| Flow, sccm | 950 | 1150 | | | | |
| Pressure | 2.5 × 10-3 torr | | | | | |
| Power, kW | 24.2 | 24.2 | 24.2 | 24.2 | 24.2 | 24.2 |
| Linespeed | 200 in/min | | | | | |

COAT ZONE #4, PROCESS PARAMETERS:

| | Cathode # | | |
|---|---|---|---|
| | 31 | 32 | 33 |
| Material | NiCr | Ag | NiCr |
| Type | Planar | Planar | Planar |
| Gas | Argon | Total | |
| Flow, sccm | 1814 | 1814 | |
| Setting | 100 | | |
| Pressure | 2.5 × 10-3 torr | | |
| Power, kW | 4.6 | 4.0 | 4.25 |
| Linespeed | 200 in/min | | |

COAT ZONE #5, PROCESS PARAMETERS:

| | Cathode # | | | | | |
|---|---|---|---|---|---|---|
| | 25 | 26 | 27 | 28 | 29 | 30 |
| Material | Si | Si | Si | Si | Si | Si |
| Type | C-Mag | C-Mag | C-Mag | C-Mag | C-Mag | C-Mag |
| Gas | Argon | Nitrogen | | | | |
| Flow, sccm | 900 | 1502 | | | | |
| Setting | 18 | | | | | |
| Pressure | 2.5 × 10-3 torr | | | | | |
| Power, kW | 30.0 | 30.0 | 30.0 | 30.0 | 30.0 | 30.0 |
| Linespeed | 200 in/min | | | | | |

With reference to FIG. 1, the above process results in a five layer coating system having the following layer thicknesses wherein:

| Layer No. in Drawing | Thicknesses (approx) (Å) |
|---|---|
| 3 ($Si_3N_4$) | 310 |
| 5 (80/20, Ni/Cr) | 13 |
| 7 (silver) | 57 |
| 9 (80/20, Ni/Cr) | 12 |
| 11 ($Si_3N_4$) | 410 | and wherein layers 5 and 9 are substantially free of any oxide or nitride of Ni or Cr. The layer system is chemically and mechanically durable as these terms are defined above, both before and after heat treatment.

As aforesaid, the sheet so coated is cut to the requisite size. One cut section of the coated sheet is then fabricated into an I.G. unit as shown in FIG. 2 using conventional techniques and a known organic sealant. The space 30 is a nominal ½" and the coating is on the inside of sheet 21 to form an unheat treated I.G. unit. The other cut section of the coated sheet is tempered as described above and similarly fabricated as the first I.G. unit, but here to form a heat treated I.G. unit.

The monolithic glass sheet had the following optical performance characteristics.

| MONOLITHIC SHEET | | | | |
|---|---|---|---|---|
| Characteristic | Before Heat Treatment | After Heat Treatment | $\Delta E^*_{ab}$ | $\Delta a^*$ |
| TY | 69.83 | 74.81 | 2.6 | |
| a* | −1.73 | −1.98 | | |
| b* | −2.10 | −0.95 | | |
| $R_GY$ | 9.91 | 8.20 | 3.95 | |
| a* | −4.58 | −4.55 | | −.03 |
| b* | −6.21 | −8.04 | | |
| $R_FY$ | 4.67 | 4.03 | 5.50 | |
| a* | −1.16 | −3.10 | | |
| b* | −2.87 | −7.65 | | |
| $R_S$ | 16.3 | 12.9 | | |
| $E_n$ | 0.197 | 0.172 | | |
| $E_h$ | 0.214 | 0.187 | | |

As can be seen the monolithic sheet has achieved heat treatability and low-E values as well as an acceptable blue-green color. The film side $\Delta E^*_{ab}$ is quite high, but this is not the important side to consider. Rather, it is the glass side characteristic $\Delta E^*_{ab}$ which is important for matchability. Here the $\Delta E^*_{ab}$ when viewed from the glass side is 3.95 while the $\Delta a^*$ is −0.03, and thus is not, monolithically, matchable. However, and noting the requisite increase in visible transmittance TY that has taken place, the I.G. units formed are matchable as demonstrated in the following chart:

| I.G. UNIT | | | | |
|---|---|---|---|---|
| Characteristic | Unheat Treated I.G. Unit | Heat Treated I.G. Unit | $\Delta E^*_{ab}$ | $\Delta a^*$ |
| Tvis | 61.68 | 65.96 | 2.47 | |
| a* | −3.22 | −3.52 | | |
| b* | −2.12 | −1.11 | | |
| $R_G$ (vis) | 13.93 | 12.63 | 1.76 | |
| a* | −4.27 | −4.31 | | −.04 |
| b* | −6.93 | −8.13 | | |
| $R_F$ (vis) | 11.65 | 11.62 | 2.11 | |
| a* | −1.62 | −1.97 | | |
| b* | −2.5 | −4.58 | | |
| T, uv | 39 | 42 | | |
| T, solar | 42 | 44 | | |
| R, solar | 14 | 15 | | |
| U-value (winter) | 0.35 | 0.34 | | |
| U-value (summer) | 0.38 | 0.37 | | |
| Shading coefficient | 0.59 | 0.60 | | |
| S.h.g.C | 0.503 | 0.519 | | |
| R.H.G. | 122 | 126 | | |

This comparison demonstrates the efficacy of this invention. Not only is matchability achieved, but commercial color and very acceptable U-values and shading coefficients are achieved as well, as will be clearly recognized by the skilled artisan when comparing this data to known commercial demands.

As further demonstrated, by maintaining both $\Delta E^*_{ab}$ and $\Delta a^*$ within the above-recited ranges, even though $\Delta b^*$ becomes relatively large, laminates and I.G. units are formed from coated monolithic sheets which themselves, while heat treatable, may not be matchable, and yet the I.G. unit and laminate is indeed very matchable. Moreover, the advantages of silver are now present in the ultimate product resulting in very acceptable U-values and shading coefficients. As still further demonstrated, a substantially neutral blue-green color, desirable for most architectural purposes is achieved because a* and b* are both kept in the negative.

Once given the above disclosure many other features, modifications and improvements will become apparent to the skilled artisan. Such other features, modifications and improvements are therefore considered to be a part of this invention, the scope of which is to be determined by the following claims:

We claim:

1. A method of making a matchable glass article having at least two glass substrates in light transmitting communication with each other, the method comprising:

a) sequentially sputter coating onto a surface of at least one of said glass substrates a heat treatable layer system which comprises from the glass substrate on which it is coated outwardly:
   a first layer of silicon nitride;
   a second substantially metallic layer of nickel or nickel alloy having a nickel content of at least about 10% by weight Ni, said layer being substantially free of a nitride or oxide of said metal;
   a third substantially metallic layer of silver;
   a fourth substantially metallic layer of nickel or nickel alloy having a nickel content of at least about 10% by weight Ni, said layer being substantially free of a nitride or an oxide of said metal; and
   a fifth layer of silicon nitride;

b) subjecting said substrate having said coating thereon to a heat treatment which increases the visible transmittance of said coated substrate by at least 4%; and c) thereafter fabricating said glass substrates so as to be in light transmitting communication with each other thereby to form said matchable glass article, wherein the heat treated glass article has a $\Delta E^*_{ab}$ value less than 2.0 and a $\Delta a^*$ value less than 0.7 due to said heat treatment.

2. The method according to claim 1 wherein said heat treatment is selected from tempering, bending and heat strengthening.

3. The method according to claim 1 wherein said glass article is an insulating glass unit comprised of two panes of glass one of said panes having said coating thereon and said fabrication step includes retaining said panes in substantially parallel relationship with each other thereby to define an insulating space therebetween and wherein said layer coating system is located on a surface of said coated pane which is located within said insulating space.

4. The method according to claim 1 wherein said article is a glass laminate comprised of at least two glass sheets, one of which has said heat treatable sputter coated layer system thereon, and said fabrication step includes laminating said coated glass sheet after it is heat treated to another glass sheet such that the said layer system is located between said glass sheets.

5. The method according to claim 1 wherein thicknesses of the layers are within the following ranges:

| Layer | Thickness (Å) |
|---|---|
| first | 310–350 |
| second | 10–20 |
| third | 52–62 |
| fourth | 10–20 |
| fifth | 390–440. |

6. The method according to claim 1 wherein said heat treatment is tempering.

7. The method according to claim 1 wherein said heat treatment increases said visible transmittance by 5%–7%.

8. The method according to claim 1 wherein said glass article has a generally neutral blue-green color and when viewed from the glass side of said coating has a $\Delta a^*$ of less than 0.5.

9. The method of claim 1 wherein said article is an insulating glass unit whose U-values and shading coefficients are substantially the same as those of an otherwise identically formed I.G. unit whose coated substrate is not heat treated.

10. The method according to claim 9 wherein said U-values and shading coefficients are:

| Characteristic | I.G. unit unheated substrate | IG Unit HT |
|---|---|---|
| U-value (winter) | 0.35 | 0.34 |
| U-value (summer) | 0.38 | 0.37 |
| shading coefficient | 0.59 | 0.60. |

11. The method according to claim 1 wherein said layer coating system so formed is mechanically and chemically durable both before and after said heat treatment.

12. A method of making a coated article, the method comprising:

providing a first substrate;

sputtering a coating system so as to be supported by the first substrate, wherein the coating system includes at least one layer comprising silver (Ag) located between at least first and second layers comprising silicon nitride; and tempering the substrate with the coating system thereon via heat treatment, wherein the tempering causes the substrate with the coating system thereon when viewed from the substrate side to experience a $\Delta E_{ab}$ of less than 2.0 and a $\Delta a^*$ of less than about 0.8.

13. The method of claim 12, wherein the tempering causes the coated substrate to experience a $\Delta a^*$ of less than 0.5 when viewed from the substrate side.

14. The method according to claim 12 wherein said first substrate with coating thereon is mechanically and chemically durable both before and after said tempering.

15. The method of claim 12 wherein a layer comprising NiCr is located between the layer comprising silver and at least one of the layers comprising silicon nitride.

16. A method of making a coated article, the method comprising:

providing a first substrate;

sputtering a coating system so as to be supported by the first substrate, wherein the coating system includes at least one layer comprising silver (Ag) located between at least first and second layers comprising silicon nitride; and heat treating the substrate with the coating system thereon via heat treatment, wherein the heat treating causes the substrate with the coating system thereon when viewed from the substrate side to experience a $\Delta E^*_{ab}$ of less than 2.0 and a $\Delta a^*$ of less than about 0.8.

17. The method of claim 16, wherein the heat treating causes the coated substrate to experience a $\Delta a^*$ of less than 0.5 when viewed from the substrate side.

18. The method according to claim 16 wherein said first substrate with coating thereon is mechanically and chemically durable both before and after said heat treating.

* * * * *